May 17, 1938.　　　　M. S. CURTIS　　　　2,118,021
IMPROVEMENTS IN MACHINE TOOL
Original Filed Nov. 30, 1927　　9 Sheets-Sheet 6
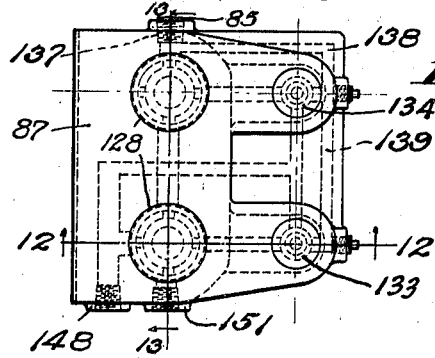
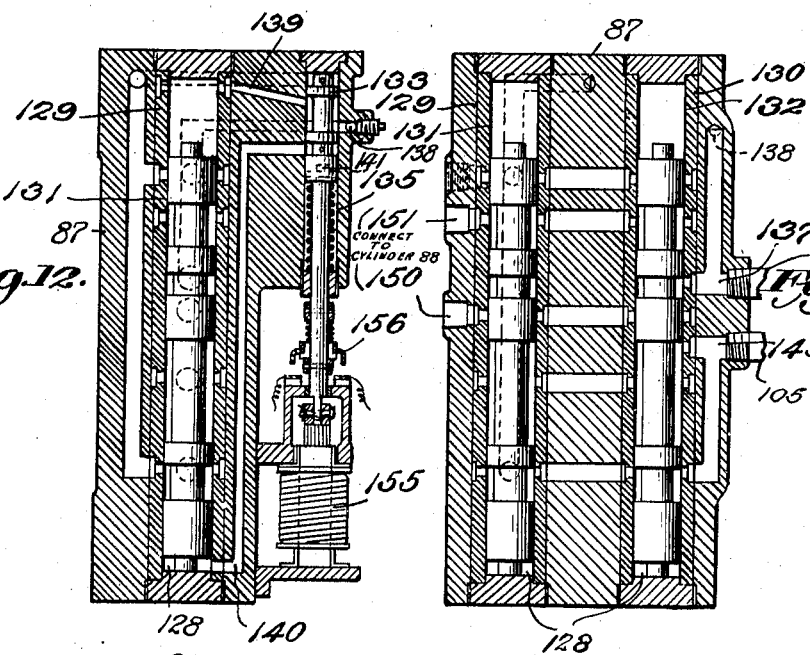
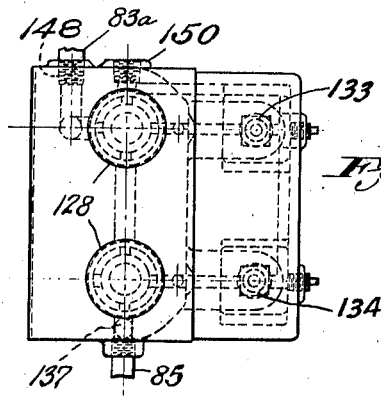
INVENTOR
Myron S. Curtis
BY
ATTORNEY May 17, 1938.　　　　M. S. CURTIS　　　　2,118,021
IMPROVEMENTS IN MACHINE TOOL
Original Filed Nov. 30, 1927　　　9 Sheets-Sheet 7
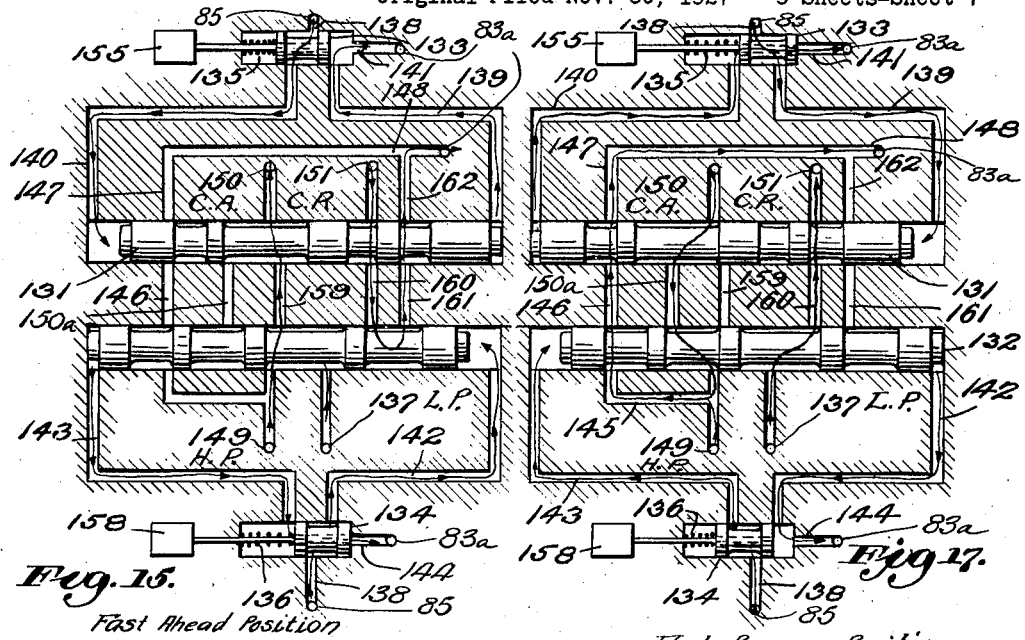
Fig. 15. Fast Ahead Position
Fig. 17. Fast Reverse Position
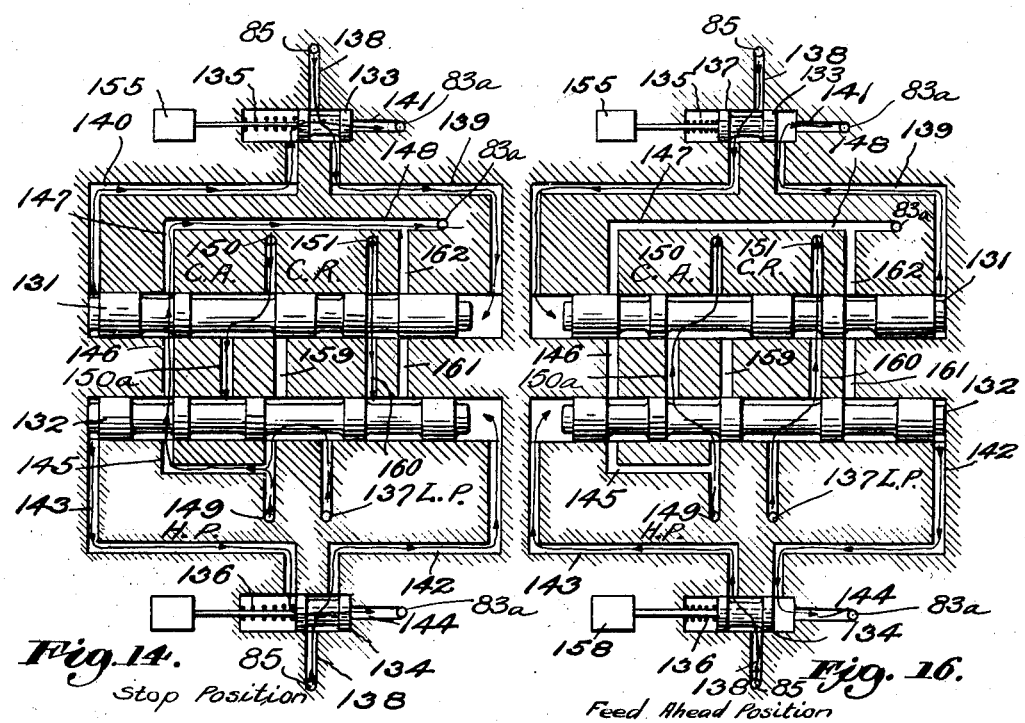
Fig. 14. Stop Position
Fig. 16. Feed Ahead Position
H. P. - High Pressure Supply
L. P. - Low    "      "
C. A. - Cylinder Ahead Port
C. R. -    "    Reverse  "
INVENTOR
Myron S. Curtis
BY
Chas. J. Williamson
ATTORNEY

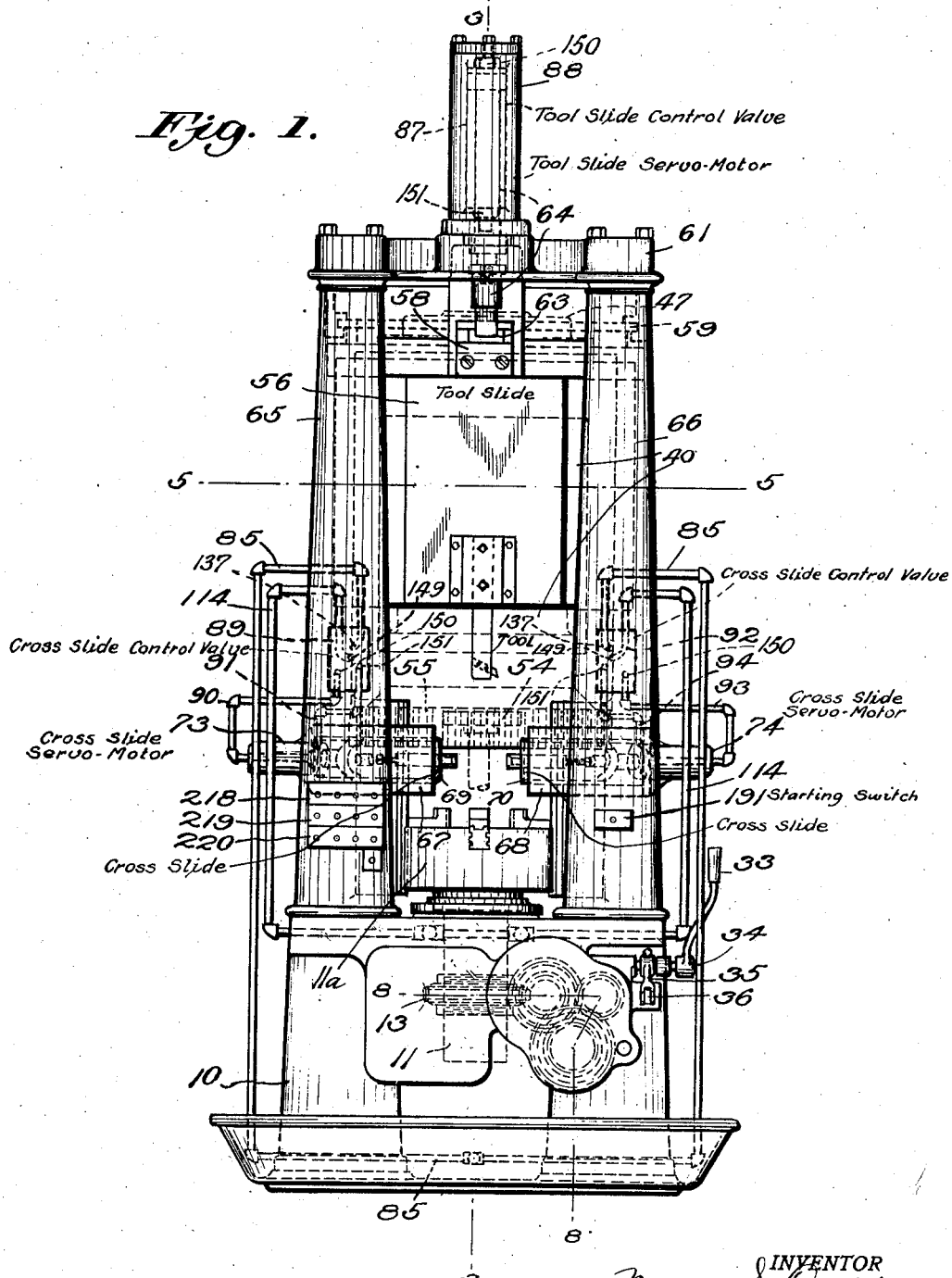

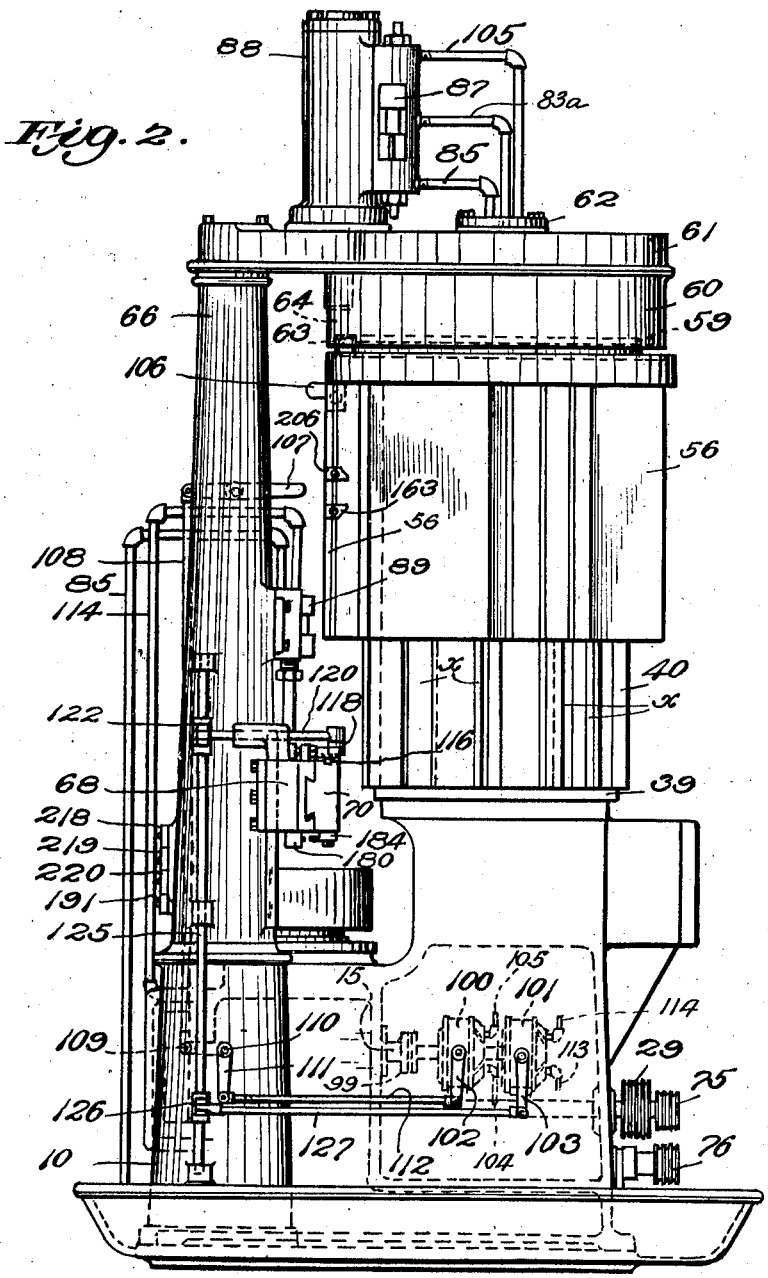

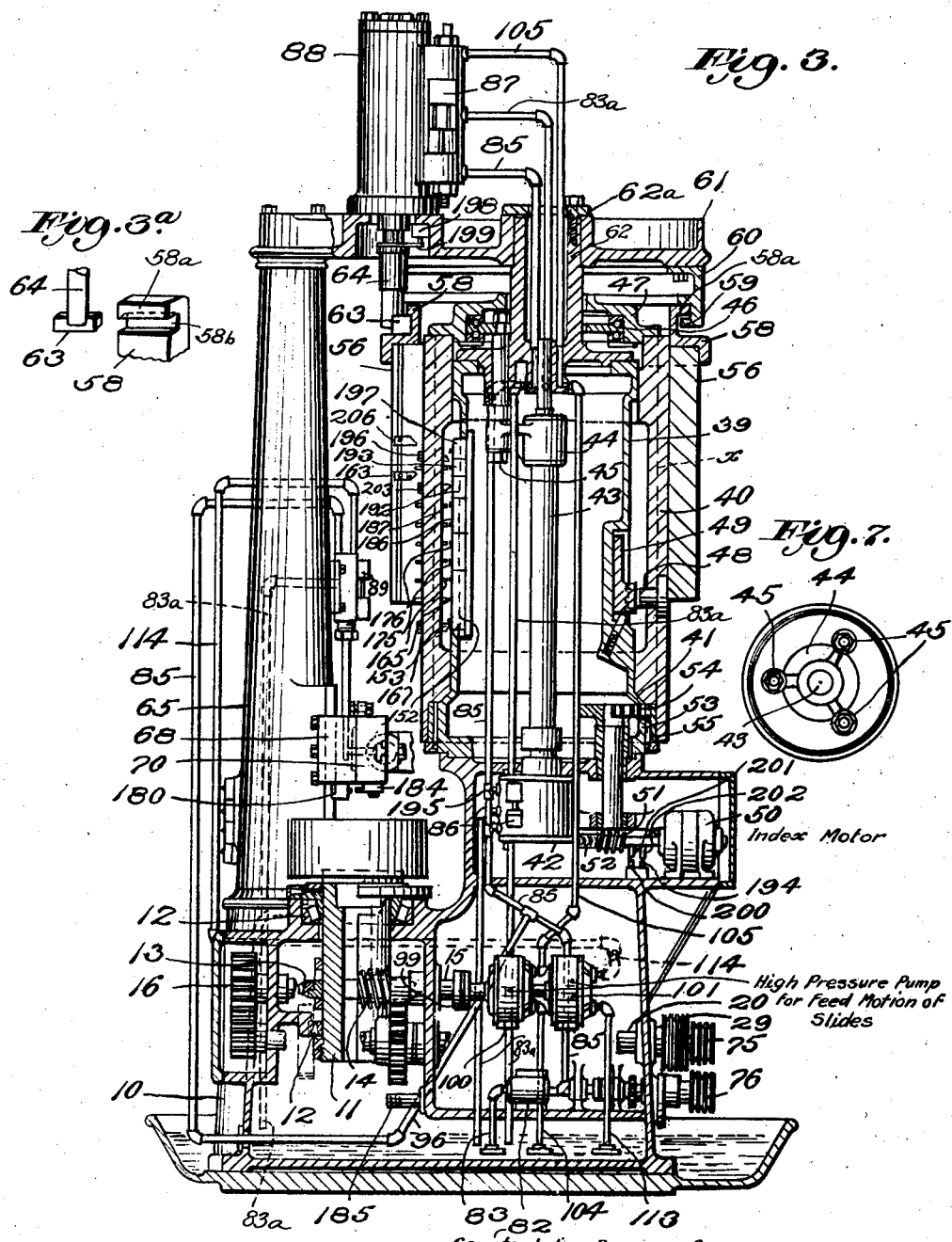

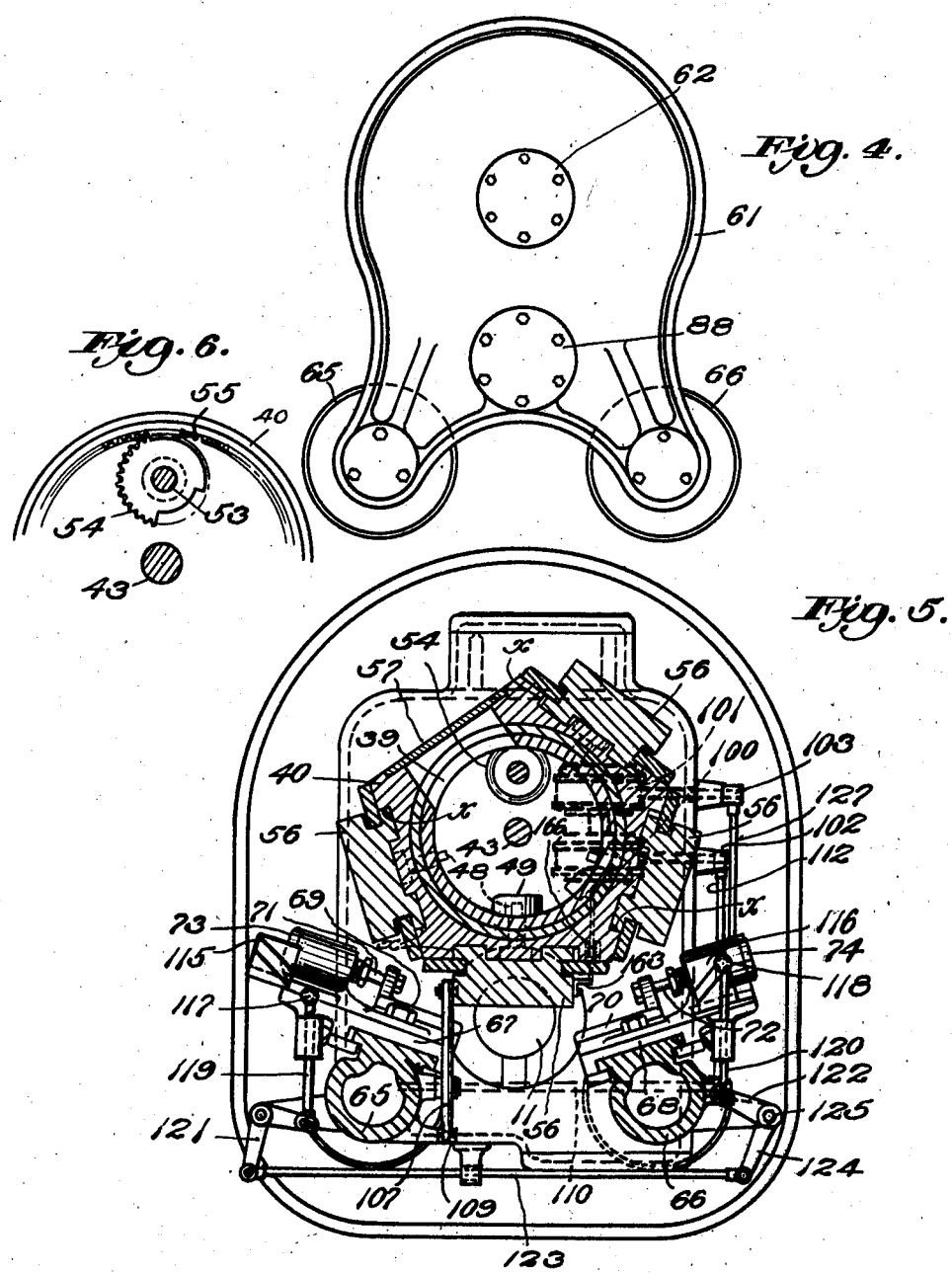

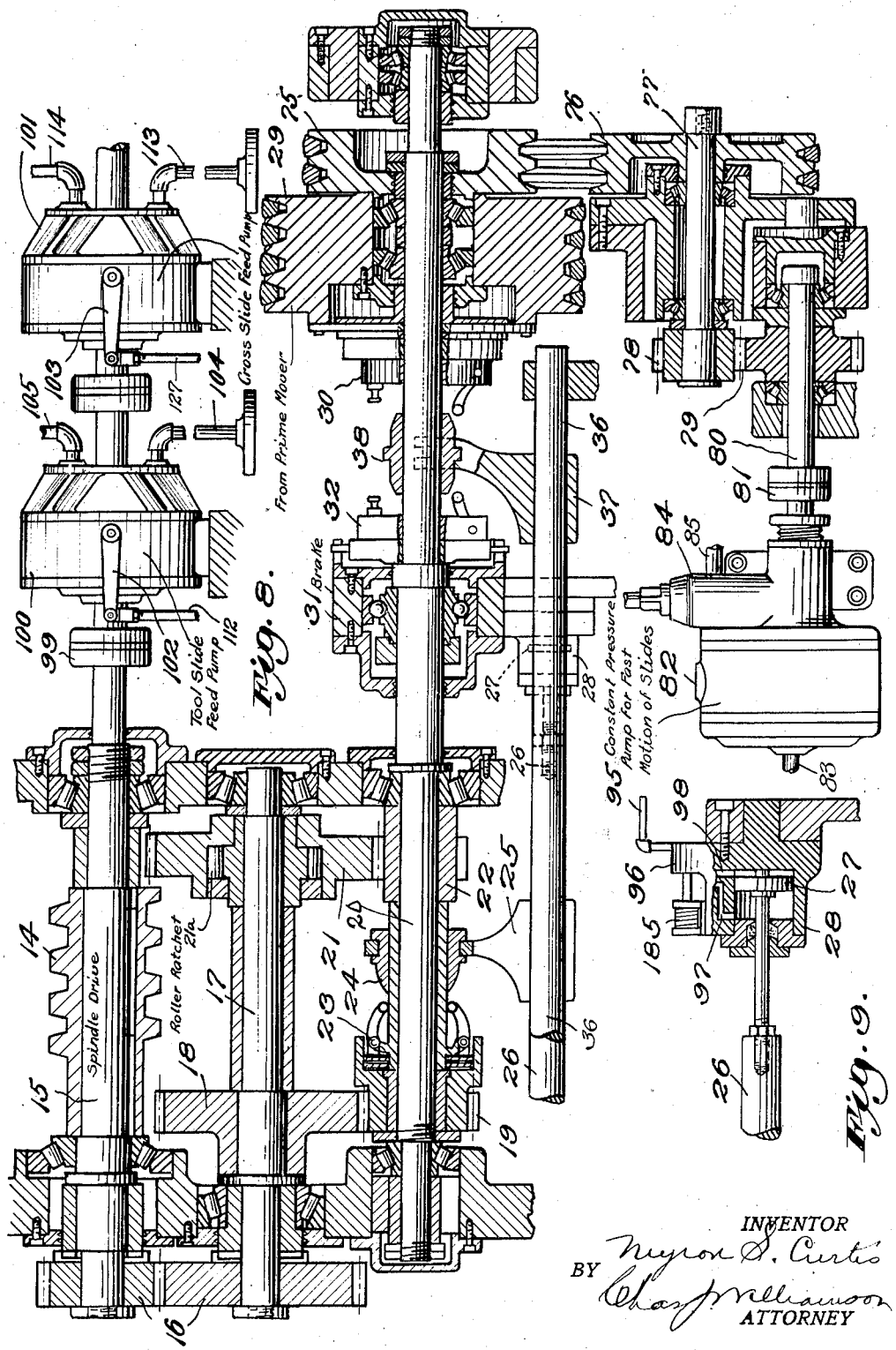

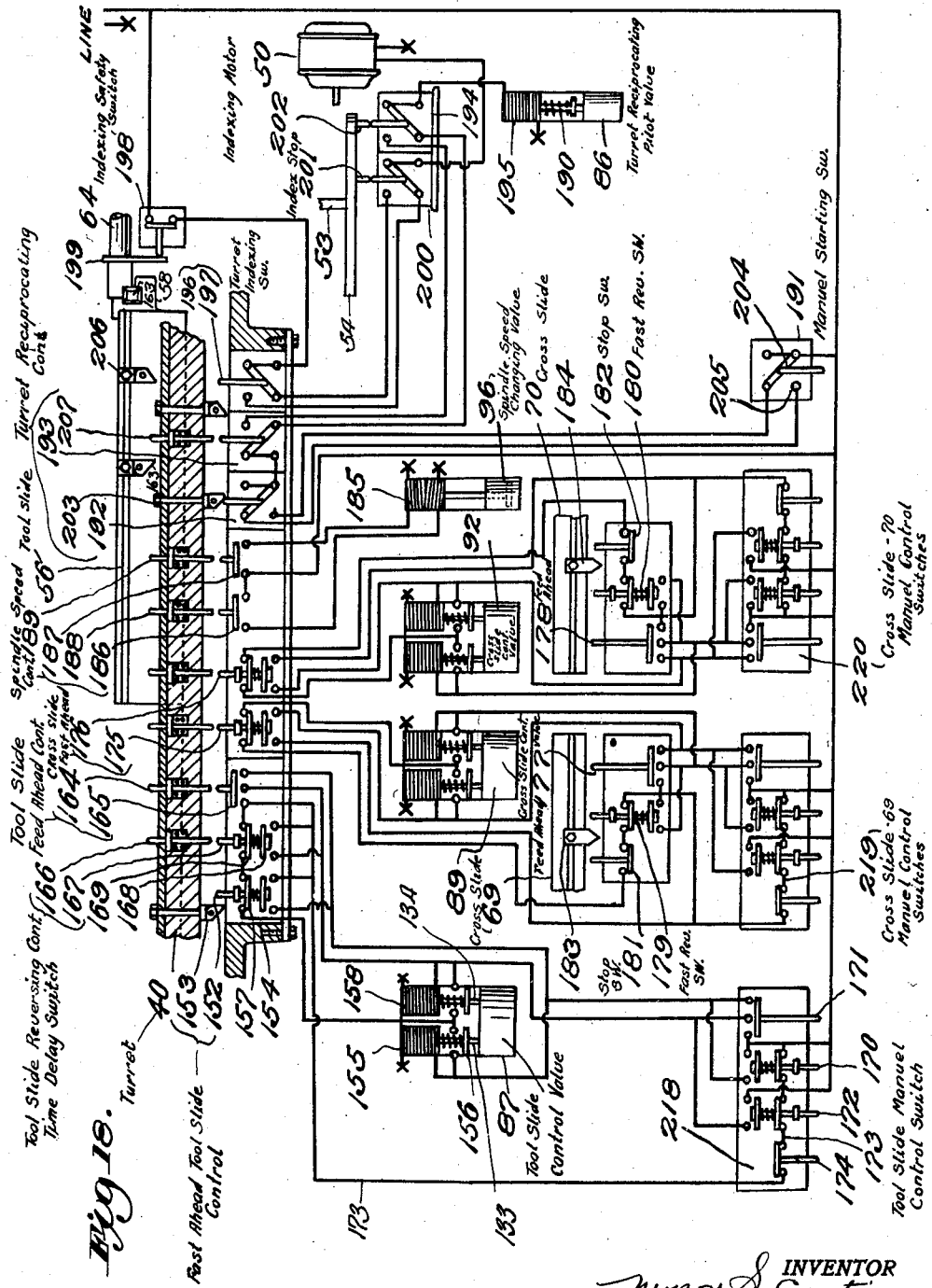

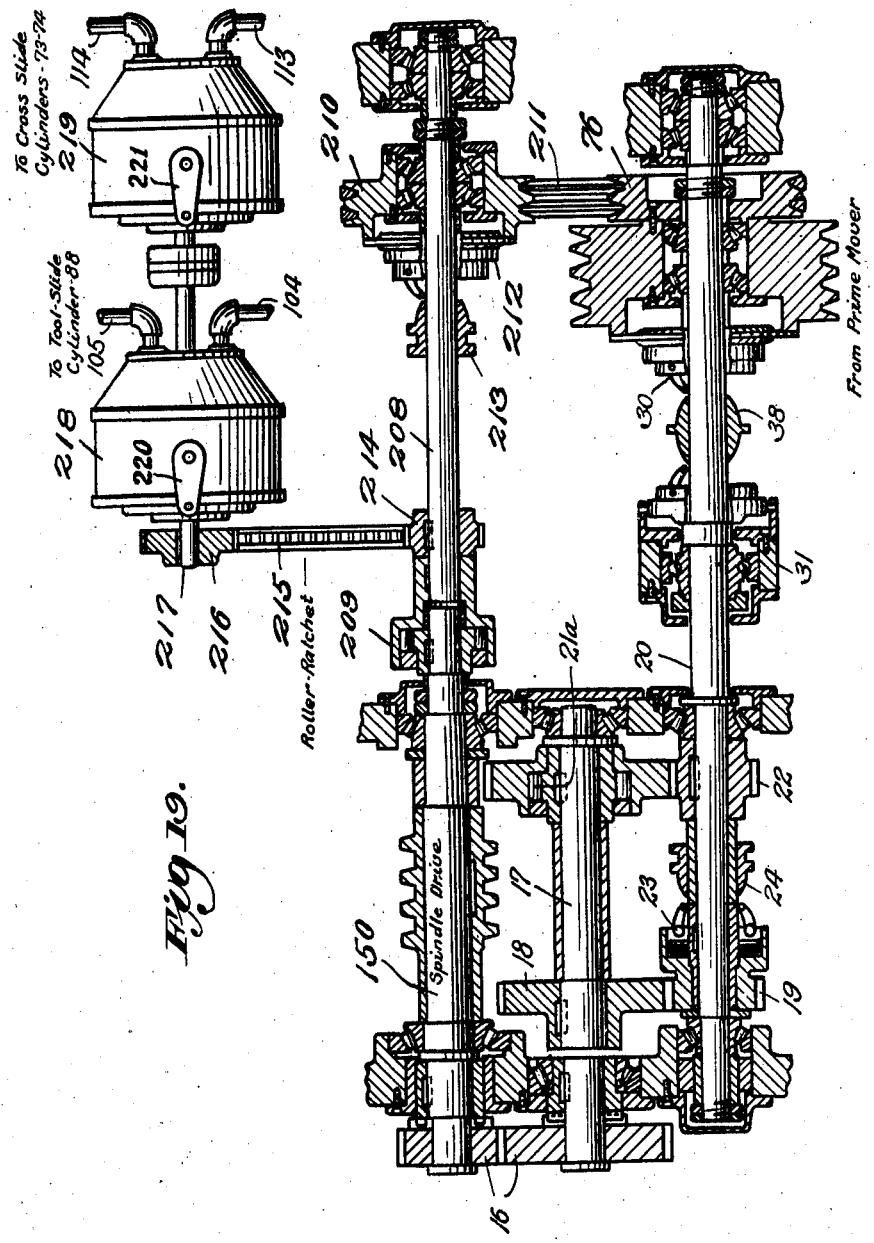

Patented May 17, 1938

2,118,021

UNITED STATES PATENT OFFICE 2,118,021

IMPROVEMENTS IN MACHINE TOOL

Myron S. Curtis, Pawtucket, R. I., assignor to William Wallace Potter, Pawtucket, R. I.

Application November 30, 1927, Serial No. 236,752
Renewed August 17, 1937

49 Claims. (Cl. 29—42)

In a machine tool broadly of the lathe type and particularly of the automatic lathe type, either chuck or center turning, there are two primary feeding motions. These are a fine feed for performing the working operations and a fast feed for bringing the tools to and from the work. I will hereinafter speak of these two feeding conditions as feed and fast motion.

It is highly desirable that the feed be driven by or in unison with the spindle because the turning feed is always measured in inches per spindle revolution. Therefore as the speed of the spindle changes, the feed per spindle revolution should remain constant which means that the feed per minute must change. This can be accomplished in many ways, but by far the simplest way is to drive the feed directly from the spindle.

It is desirable that the fast idle motions of the tool carrying slides be performed in the shortest time possible and always in this shortest time. It is therefore highly desirable that the fast idle movements of the slides be driven by a constant speed driving member.

With a machine tool of the lathe type, particularly of the automatic or semi-automatic type, the following conditions are also highly desirable:

1st. That the machine tool be driven from one constant speed driving shaft.

2nd. That there be automatic and hand changes of speed between this constant speed drive shaft and the spindle.

3rd. That there be automatic and hand changes of feed between the spindle and the tool carrying members.

The following seven conditions are therefore of supreme importance in the design of automatic or semi-automatic machine tools for turning:

1. A constant speed driving shaft;
2. A work carrying spindle driven by the constant speed driving shaft;
3. Automatic and hand changes of speed between the constant speed driving shaft and the spindle;
4. A tool carrier feeding means driven by or geared to the spindle;
5. Automatic and hand changes of feed between the spindle and the tool carrier feeding mechanism;
6. A constant speed fast motion for the idle movements of the tool carriers, this motion being driven from the constant speed shaft;
7. Automatic and hand means for controlling these various mechanisms.

The object of my invention is to provide a construction which will, in a machine tool using hydraulic feeding means, satisfy the above conditions.

My invention consists in whatever is described by, or is included within, the terms or scope of the appended claims.

As an exemplification of what I now regard as a very satisfactory embodiment of my invention, I illustrate my invention as embodied in a single, vertical spindle automatic turret lathe. It is to be understood, however, that my invention may be embodied in machines of different construction and of altogether different types. Such machine as illustrated in the drawings as one embodiment of my invention will be found to have the following characteristics: (1) A vertical work carrying spindle driven by a constant speed driving shaft with automatic and hand changes of speed between the driving shaft and the spindle; (2) A five sided barrel or platen rotatably and slidably located on an upright column, the axis of which is parallel to the axis of the spindle; (3) Hydraulic means for raising and lowering this platen; (4) Means for indexing the platen so as to present successive faces to the spindle; (5) Means for locating the platen in any of said positions; (6) A series of tool carrying slides, slidably located on said platen and normally held in their extreme upward position; (7) Hydraulic feeding means for the slide that happens to be presented to the work carrying spindle; (8) Cross slides performing facing cuts; (9) Hydraulic means for feeding these cross slides; (10) Piston type adjustable stroke pumps connected to and driven by the spindle for performing the feeding operation; (11) Automatic means for varying the stroke of the aforementioned pumps and thereby varying the feed in relation to the spindle; (12) A constant speed pump driven by the constant speed shaft for supplying fluid for the idle or fast motions; (13) Automatic means for varying the spindle speeds; (14) A control mechanism consisting of valves with their necessary operating means; and (15) Electric control means for all the movements of the various instrumentalities.

In the drawings:

Fig. 1 is a front elevation of such machine tool;
Fig. 2 is a side elevation of the same;
Fig. 3 is a vertical section approximately on the line 3—3 of Fig. 1;
Fig. 3a is a detail view in perspective of the slide engaging device;
Fig. 4 is a plan view of the frame;
Fig. 5 is a horizontal section on the line 5—5 of Fig. 1;

Fig. 6 is a horizontal elevation of the platen index gear and pinion;

Fig. 7 is a plan detail view of the platen lifting connection;

Fig. 8 is a section through the gearing, approximately on the line 8—8 of Fig. 1;

Fig. 9 is a detail of the clutch operating cylinder and valve;

Fig. 10 is an end elevation of one of the control valves;

Fig. 11 is the other end elevation of the same valve;

Fig. 12 is a section on the line 12—12 of Fig. 10;

Fig. 13 is a section on the line 13—13 of Fig. 10;

Figs. 14, 15, 16 and 17 are views, somewhat diagrammatic, illustrating the various positions of the control valve and the direction of the flow of the liquid therethrough;

Fig. 18 is a diagrammatic view of the wiring of the machine;

Fig. 19 is a section similar to Fig. 8 showing another embodiment of my invention in regard to the spindle and pump connections.

The description of the machine shown in the drawings as one embodiment of my invention may be conveniently divided into and will be found under the following sub-titles:—

1. The machine members or elements.
2. Mode of operating members.
3. Control of operation of the members.
4. The cycle of operations.

It will be found that the embodiments of the invention of this application have characteristics which are the subject of the application of William Wallace Potter and Myron S. Curtis, No. 230,119, filed October 31, 1927. By the term "hydraulic" used in this specification it is to be understood that that term includes other fluids in any embodiments of my invention in which may be utilized any other fluid than a true liquid and any other liquid than oil which, for well known reasons, is best suited for certain uses, such as in the particular machine illustrated in the drawings.

*The machine members or elements*

The machine base 10 has mounted in it a vertical spindle 11 carrying a chuck 11a in which base the spindle is journaled by roller bearings 12 near top and bottom. A worm gear 13 is fixed to the spindle to rotate the same and is driven by worm 14 on horizontal shaft 15 which, by several trains of gearing, may be driven at various speeds so that the speed of the spindle may be varied. (See Figs. 1, 3 and 8.) These trains include hand change gears 16 and a shaft 17 parallel with shaft 15 and two automatically controlled trains which include a gear 18 on shaft 17 meshing with a pinion 19 loose on a drive shaft 20 and a gear 21 with a roller ratchet clutch connection 21a with the shaft 17 that meshes with the pinion 22 fixed to said drive shaft. The two gears on the shaft 17 may be either of two speeds. The loose pinion 19 is adapted to be automatically clutched to and unclutched from the drive shaft 20, and when it is clutched thereto the shaft 17 is driven therefrom, and when it is unclutched therefrom, the shaft 17 is driven by pinion 22 through roller ratchet 21a. In itself, these gear connections are of well known construction and action. The clutch for the pinion 19 is a friction clutch 23 of usual construction operated by a slidable thimble 24 on the drive shaft which is engaged by clutch yoke 25 fixed to a rod 26, which at one end is connected to a piston 27 in a hydraulic cylinder 28 (see Fig. 9). Fluid pressure is introduced into the cylinder 28 on opposite sides of the piston 27 whereby the latter may clutch and declutch the clutch 23 for effecting the above stated operation.

Shaft 20 may be clutched to constant speed drive pulley 29 by friction clutch 30, thus driving the spindle, or may be clutched to housing 31 by friction clutch 32, thus braking the spindle. These clutches 30 and 32 are operated by a clutch thimble 38 slidable on the shaft 20 and actuated by the hand lever 33 (see Fig. 1) fast on a stud shaft 34 which is mounted in the frame 10. The stud shaft has a lever 35 fast thereon, connecting one end of a slide rod 36 to which is secured a yoke 37 engaging the thimble 38. Movement of the handle in one direction will positively operate the clutch 30 and in the opposite direction it will declutch clutch 30 and positively operate clutch 32, the neutral position of the handle permitting both clutches 30 and 32 to remain ineffective.

Bolted to machine base 10 is a tubular column 39 (see Figs. 1, 2, 3 and 5) with its axis parallel to spindle 11, and which has slidable and rotatable on it a multi-faced platen or turret 40, the periphery of which in cross section is pentagonal, as shown, and four of its five faces each having guideways $x$ for one of four tool slides 56. This turret when in its downward position is held rigidly against a seat 41 (see Fig. 3) by means of a piston in hydraulic cylinder 42 operating on the turret 40 through rod 43, spider 44, bolts 45, thrust bearing 46 and end plate 47. The turret is rotatable for indexing through five steps and at each step is held from rotation by lock bolt 48 that enters a slot in lock bolt block 49, rigidly fastened to the stationary column or housing 39. There is one block 49 and five lock bolts 48 corresponding to the five different faces of the platen. Turret 40 may be raised by the piston in cylinder 42 and when it is at its extreme upward position the lock bolt 48 is lifted clear of block 49, and the indexing is then done by motor 50 (see Figs. 3, 5, 6 and 18) through worm 51, worm gear 52, shaft 53, intermittent pinion 54, and intermittent gear 55 on the lower end of the turret (see Figs. 3 and 6). Slidable in the guideways $x$ of the turret 40 are slides 56, there being one slide for each face except face 57 which may be left blank for loading and unloading (see Fig. 5), that is putting a work-piece in and removing it from the chuck. Each of the tool slides 56 has secured to its upper ends means for maintaining it in raised suspended position until it has been brought in position for cooperation with the spindle of the work-piece on the spindle. For purposes of the present disclosure this means consists in what may be termed a "jaw" 58 provided with an outwardly extending lateral flange 58a to cooperate with and overlie an inwardly extending lateral flange 59 on the lower edge of an annular stationary housing 60 supported from the under face of top plate 61. Of course, the flange or lip 59 may extend into a groove 58b on the jaws 58 (see Figs. 3 and 3a). Thus, the slides 56, not in working position, are normally held in their extreme upward position by the annular flange member 59. In order to permit a tool slide 56, brought in position by the turret, to move with respect to the spindle and the work-piece supported by the chuck 11a, a portion of the flange 59 opposite the spindle is cut away and in its stead is substituted a reciprocal block 63 which normally forms a continuation of the flange 59, the block 63 being carried by a piston rod 64 extending from the cylinder 88. Thus, as the turret 40 is rotated, carrying with it the tool slides 56, the jaw 58 of one of the tool slides is brought in position to have the flange 58a thereof overlie the block 60 and, when in this position, the tool slide may be reciprocated to and from the work-piece on the spindle through operation of the piston rod 64.

The term "platen" has reference to that type of tool support which has a flat or plane surface, on which a tool slide may be moved, to which slide the tools may be secured as by providing special holes for clamps to suit the individual requirements of the particular piece of work to be dealt with.

Rigidly fastened to base 10 and to plate 61 (and preferably in the front of the machine) are two vertical columns 65 and 66, on which are adjustably located left and right-hand slide bases 67 and 68, respectively. Slidable in these bases are cross slides 69 and 70 to which are attached piston rods 71 and 72, respectively, operating in cylinders 73 and 74 (see Figs. 1, 3 and 5).

Mode of operating members

Attached to pulley 29 is pulley 75 which is belted to and drives pulley 76 fastened to shaft 77 and, thus, by means of pinion 78, gear 79, shaft 80 and coupling 81, drives pump 82 at a constant speed. Pump 82 has a suction pipe 83 (see Figs. 2, 3 and 8) and a relief valve 84 which may be set at a pre-determined comparatively low pressure. Therefore, the delivery from pump 82 is at a constant pressure and a constant volume and such delivery is through pipe 85 to platen control valve 86 on cylinder 42, tool slide control valve 87 on cylinder 88, cross slide control valve 89 which operates cylinder 73 through pipes 90 and 91, and cross slide control valve 92 which operates cylinder 74 through pipes 93 and 94 (see Fig. 1) all of which valves or cylinders have connected thereto a drain pipe 83a. Pump 82 also by means of pipe 95 (see Fig. 9) delivers fluid to valve 96 which operates piston 27 through ports 97 and 98 for controlling the spindle clutch 23 (see Fig. 8). Thus fluid at a constant pressure is being constantly supplied to these various valves and is utilized for operating the platen, tool slide, cross slide, clutches, etc., on their rapid motions, and to operate the control valves.

Driven from spindle worm gear shaft 15 (see Figs. 2, 3 and 8) through coupling 99 and, thus, running synchronously with spindle 11, are pumps 100 and 101. These are preferably of the piston displacement type to deliver comparatively high pressure and therefore their discharge varies exactly with their speed of rotation. The stroke of the pistons may also be varied by movements of levers 102 and 103. This also varies the discharge of the pump. Pump 100 has a suction 104, and through pipe 105, delivers fluid to valve 87 on cylinder 88 (see Fig. 3) and, thus, furnishes fluid for feeding the tool slides 56. The stroke of this pump may be varied by movement of tool slide 56 through dog 106 (see Fig. 2) operating on lever 102 on the pump, through lever 107, rod 108, lever 109, cross shaft 110, lever 111 and rod 112 connected with lever 102 on pump 100. Pump 101 has a suction pipe 113 and by delivery pipe 114 delivers fluid to cross slide control valves 89 and 92 (see Figs. 1, 3 and 8). The stroke of the pump 101 may be varied by either cross slide 69 or cross slide 70 by means of cams 115 and 116 (see Fig. 5) which are fastened to these slides and which operate lever 103 on the pump by means of cam rolls 117 and 118, push rods 119 and 120, levers 121 and 122, cross rod 123, lever 124, vertical shaft 125, link 126 and rod 127 (see Figs. 2 and 5). Thus, the rate at which fluid is supplied to cylinder 88 which operates slide 56, and to cylinders 73 and 74 which operate cross slides 69 and 70, will vary exactly with the speed of the spindle and may be varied automatically by the slides themselves.

Control of operation of the members

The flow of oil to the cylinder 88 is controlled by valve 87 which consists of a body having two chambers 128 in which are located bushings 129 and 130, respectively, in which bushings are disposed slide valves 131 and 132, respectively. Each of these valves has two positions, which positions are controlled by pilot valves 133 and 134, respectively.

Valves 133 and 134 are normally held in positions shown in Fig. 14 by springs 135 and 136, respectively. The low pressure from pipe 85 enters through port 137 and a portion of it passes through passage 138 to pilot valves 133 and 134. Passing through valve 133, in the direction shown by the arrows, it passes through passage 139 to the end of valve 131 which it pushes into the position shown, the exhaust on the other end of valve 131 passing out through port 140 to drain 141. The low pressure entering valve 134 passes in a direction shown by arrows through port 142 to the end of valve 132 pushing it into the position shown, the exhaust from the other end of valve 132 flowing through passage 143 out through drain 144. The low pressure entering port 137 passes in direction shown by arrows through passages 145, 146 and 147 to the drain 148, the high pressure from pipe 105 of pump 100 entering through port 149 passing through passages 145, 146 and 147 to the drain 148, the cylinder ahead port 150 is closed and the cylinder reverse port 151 is also closed, it being understood that ports 150 and 151 are connected to the cylinder 88 on opposite sides of its piston. In this position no oil is flowing to the cylinder 88 and it is therefore held in a stop position. It will also be seen that as the pilot valves 133 and 134 are normally held closed by springs 135 and 136 that should anything disturb the flow of current for operating these valves the valves are immediately moved to a stop position.

When "fast ahead platen slide" switch 152 (see Figs. 3 and 18) is depressed by dog 153 by the downward movement of the platen or turret 40 to its seat 41, the circuit is first closed by disc 154 allowing current to flow from the line through the pilot valve solenoid 155 which pulls valve 133 into the position shown in Fig. 15 and allows contact disc 156 to close a holding circuit (see Fig. 18). Further continued depression of switch 152 causes disc 157 to break the holding circuit. Therefore, no current can flow to solenoid 158 and pilot valve 134 will be held by spring 136 in the position shown in Fig. 15. As dog 153 moves away from switch 152 the first operation is for disc 157 to close the holding circuit; the next is to allow disc 154 to break the lifting circuit, the holding circuit now flowing through solenoid 155 holding valve 133 in position shown in Fig. 15. The low pressure now enters valve 133 through port 138 and passage 140, pushing valve 131 to position shown, the exhaust passing out through passage 139 to drain 141. Valve 132 remains in its original position. In this position the high pressure from pipe 105 flows through ports 149 and 159 to the cylinder ahead port 150 and the low pressure also flows from pipe 85 through ports 137 and 159 to the "ahead" port 150 in cylinder 88. The cylinder "reverse" port 151 is open through passages 160, 161, 162 to the drain 148, and the piston in cylinder 88 is moved ahead rapidly for feeding the tool slide 56 toward the work in idle movement.

As the tool slide 56 moves toward the work, dog 163 carried thereby, engages switch pin 164 on the platen or turret 40 and closes switch 165. This allows current to flow through both pilot valve solenoids 155 and 158, pulling valve 134 into position shown in Fig. 16, closing the holding circuit for these solenoids and the low pressure entering port 138 passes through passage 143 and pushes valve 132 into the position shown in Fig. 16, the exhaust from the other end of the valve passing out through passage 142 to drain 144. As current is already flowing through solenoid 155 no change in position of valve 133 takes place. In this position high pressure enters port 149 and passes through passage 150a to the ahead port 150 of cylinder 88. The low pressure flows from passage 137 passes through port 160 to the reverse port 151 of cylinder 88. In this position the high pressure is on the ahead side of the cylinder and the low pressure backing up on the reverse side of the cylinder thus resulting in a slow feed ahead movement of the tool slide for work performing operations.

When the slide 56 has finished its work a dog 163 operates on push pin 166 depressing switch 167. The first part of the movement allows disc 168 to close the circuit to solenoid 158, but as current is already flowing through this solenoid through the holding circuit no movement takes place. Further depression of switch 167, however, causes disc 169 to break the holding circuit, thus allowing spring 135 to push valve 133 into the position shown in Fig. 17, the circuit through disc 168 holding the pilot valve solenoid 158 in its proper position to effect the fast reverse movement of the tool slide from the work. As dog 163 leaves pin 166, and switch 167 rises, plate 169 first closes the holding circuit thus keeping current flowing through solenoid 158 before disc 168 breaks the lifting circuit of the pilot solenoid 158. The pilot valves are now in the position shown in Fig. 17 and the low pressure entering port 138 of pilot valve 133 flows through passage 139, pushing valve 131 into the position shown and allowing the exhaust to pass out through passage 140 to drain 141. Valve 132 remains in its previous position. In this position the high pressure flows from port 149 through passages 145, 146 and 147 into drain port 148. The cylinder ahead port 150 is also open to the drain pipe 83a through passages 150a 145, 146 and 147 into drain port 148. The low pressure enters port 137 and passes through passage 160 to the reverse port 151 of cylinder 88. As the cylinder ahead port 150 is open to the drain and the low pressure is flowing into the cylinder reverse side, the slide is rapidly returned. The switch 167 may be and preferably is operated by a time delay switch as described in patent application No. 230,119, filed October 31, 1927.

The pilot control valve mechanism 87 (containing pilot valves 133 and 134) may be manually operated by hand switch 170 in switch box 218 (Figs. 1, 2 and 18) which corresponds to automatic fast ahead switch 152, hand switch 171 which corresponds to automatic feed ahead switch 165, and hand switch 172 which corresponds to automatic fast reverse switch 167. It will be noticed that all the current for operating the automatic switches flows through the holding circuit 173 of the manual switch therefore, breaking this circuit will cut off all current from the solenoids, allowing springs 135 and 136 to throw the control valve into the stop position. This circuit may be broken by means of stop switch 174.

Cross slide control valve mechanisms 89 and 92 which are in every way similar in design and action to control valve mechanisms 87, and which operate the cross slides 69 and 70, respectively, are operated in the same way as hereinbefore described, except that (1) port 149 is connected to pipe 114 port 150 connected with pipes 90 or 93, and port 151 connected with pipes 91 or 94 (see Fig. 11); and (2) the cross slide fast ahead switches 175 and 176 of cross slides 69 and 70, respectively, are operated by the tool slide 56, while the feed ahead switches 177 and 178, the fast reverse switches 179 and 180 and the stop switches 181 and 182 are operated by dogs 183 and 184 on the cross slides 69 and 70, respectively (Fig. 18). The cross slide operating valves are also manually controlled in the same way as the platen slide operating valve 87 by switches in boxes 219 and 220 (see Figs. 1, 2, and 18).

Valve mechanism 96 (see Figs. 9 and 18) which controls the piston 27, operating the speed clutch thimble 24 (Fig. 8) is operated by a push and pull solenoid 185. Current is led to one side or the other of this solenoid by switch 186 or 187 which are closed by dogs 163 on the tool slides 56 through push pins 188 and 189.

Valve mechanism 86, which controls cylinder 42 for raising and lowering the platen or turret 40 (see Figs. 3 and 18) is normally held by spring 190 in such a position that liquid flows to the top of the piston in cylinder 42, thus holding the platen down on the seat 41. On starting operation the machine manual switch 191 (see Figs. 1 and 18) is closed allowing current to flow from the line through switch 192, switch 193 and switch 194 to solenoid 195, operating valve 86 against the bias of the spring 190 so that fluid is admitted to the under side of the piston in cylinder 42, thus raising the platen or turret 40. As the platen reaches the top of its stroke dog 196 (see Figs. 3 and 18) on the platen or turrent 40 moves switch 197 to bridged suitable contacts and as the slide 56 is at its extreme top position, switch 198 is also closed by finger 199 on piston rod 64. Current then flows from the line through switch 198, switch 197 to bridged contacts of switch 200 to motor 50 which revolves index pinion 54 (see Figs. 1, 3, 6 and 18) and indexing the platen or turret 40. When pinion 54, attached to shaft 53 has completed one revolution (see Figs. 5, 6 and 18), which corresponds to indexing one station of the platen, pin 201 on pinion 54, operates to throw switch 200, breaking the circuit to motor 50 and stopping the index. At the same time pin 202 on pinion 54 operates to throw switch 194, breaking the circuit to solenoid 195, thus allowing spring 190 to operate valve 86 so that liquid is now flowing to the top side of the piston in cylinder 42 and platen 40 is pulled downwards upon its seat 41.

Switches 191, 192, 193, 197, 194 and 200 are of a well known toggle type, so designed that each time the switch plunger is depressed, the circuit will be changed.

The position of the various switches shown in Figs. 3 and 18 and operated by dogs on the platen 40, the platen slide 56, cross slides 69 and 70 is not to be considered as indicative of the sequence of operation thereof, as their position may be such as to produce any sequence of operation desired.

The cycle of operations. (See Fig. 18)

Assuming that a work piece has just been finished, cross slides 69 and 70 have returned to the extreme rear position and there stopped and slide 56 has returned to its extreme top position closing switch 198, plate 40 is then in its extreme downward position resting on its seat 41 and dog 203 which is on one station only of platen 40 has operated to throw switch 192 so that no current is flowing through the platen lifting circuit and the machine, therefore, cannot function. The switches will now all be in the position shown in Fig. 18. A piece of work is inserted in the chuck and switch 191 is operated manually which throws the switch lever 204 so as to close contacts 205. Current now flows from the line through switch 191, switch 192, switch 193 and switch 194 to solenoid 195, operating valve 86 so that the platen starts upwards. When it reaches the top of its stroke, dog 196 throws switch 197 allowing current to flow through switch 200 to motor 58, thus indexing the platen. At the end of one revolution of shaft 53 corresponding to an index of one platen station, dog 201 throws switch 200 into the opposite circuit than that shown breaking the motor circuit and stopping the index. Dog 202 throws switch 194 into the opposite position breaking the circuit through solenoid 195 allowing spring 190 to operate valve 86 so that the platen is pulled downwards. When platen 40 reaches the bottom of its stroke dog 153, of which there is one for each platen station, closes switch 152, thus operating valve 87 of the platen slide into the fast ahead position, shown in Fig. 15, and slide 56 moves rapidly toward the spindle. At any position in the movement of slide 56, dogs 163 may be set to operate switch 175 or 176, thus starting the cross slide cycle of operations. The cross slide cycle of operations is completed by dogs 183 and 184 on cross slides 69 and 70 operating on their respective switches. The spindle speeds may also be changed at any position in the movement of slide 56 by means of dog 163 operating switch 186 or 187. When slide 56 reaches the end of its downward stroke, dog 163 operates switch 167 throwing control valve 87 into the fast return position and slide 56 rapidly returns to its topmost position. As dog 206 passes over plunger 207, it operates switch 193 which in turn closes the circuit through solenoid 195 and starts the platen or turret 40 upwards. When slide 56 reaches its topmost position it closes switch 198, and upon the arrival of platen 40 at its topmost position dog 196 operates switch 197 closing the index circuit, and the cycle is repeated. As the platen indexes the slide 56, which has been in operation, moves with it and passes out of engagement with block 63 on piston rod 64 and engages with flange 59 on annular housing 60 which holds it at the top of its stroke while in inoperative position. Meanwhile, another slide has indexed so as to mesh with block 63 on piston 64. These operations continue automatically until the platen has indexed one complete revolution when dog 203, which is on one face only of the platen, operates to throw switch 192, thus breaking the lifting circuit until manual switch 91 is operated.

Pump connections of Fig. 19

The pumps 100 and 101, shown in Fig. 8, have the following characteristics. By movement of the levers 102 and 103, in the manner above set forth, the stroke of the pumps can be changed from zero to full stroke in one direction or from zero to full stroke in the other direction, thereby reversing the flow. By omitting the low pressure pump 82, with its attendant piping and the pumps 100 and 101 driven from the spindle it is possible, by manipulation of the levers 102 and 103, to obtain any condition of flow and, therefore, of feed up to the capacity of the pumps similar to pumps 100 and 101. This feed will be synchronous with the spindle revolutions. By disconnecting these pumps from the spindle and driving them from the pulley 29 at a constant speed by manipulation of the levers 102 and 103 I can get maximum conditions of flow at a constant rate either ahead or reverse for the idle fast movements. I accomplish this by the arrangement shown in Fig. 19. In line with the shaft 150 (corresponding to 15 in Fig. 8) is a shaft 208 connected with the shaft 150 by a roller ratchet coupling 209 so arranged that shaft 150 will drive shaft 208, but when shaft 208 is driven at a higher speed than shaft 150 the ratchet coupling will allow shaft 208 to overrun shaft 150. Running idle on shaft 208 is a pulley 210 driven by belts 211 from the constant speed driving pulley 76. Through friction clutch 212, shaft 208 may, by means of thimble 213, be clutched to or unclutched from pulley 210. Keyed to shaft 208 is sprocket 214 which, by means of chain 215, drives the sprocket 216 keyed to pump shaft 217, thus driving pumps 218 and 219, corresponding with pumps 100 and 101, Fig. 8. Pump 218 is connected with the platen slide feeding cylinder 88, and pump 219 is connected with the cross slide feeding cylinders 73 and 74.

Levers 220 and 221, and thimble 213 are operated by the various slides. The action will be as follows: Shaft 208 will be clutched to pulley 210, therefore over-running spindle drive shaft 150 and driving pumps 218 and 219 at a constant speed. Levers 220 and 221 will be so manipulated as to give a maximum forward discharge of the pumps, and the slides will approach the work at a constant fast speed. When they reach the work, shaft 208 is unclutched from pulley 210, roller ratchet coupling 209 will pick up the load and shaft 208 will be driven from shaft 150, synchronously with the spindle. At the same time levers 220 and 221 will be shifted so that the pumps discharge the proper amount for tool feeding operations. At the end of the feeding stroke levers 220 and 221 will be thrown so as to give the maximum pump capacity in a reverse direction and at the same time shaft 208 will be clutched with pulley 210, thus revolving the pumps at a high constant speed for reversing the slides to their initial position for beginning the next cycle of operation.

A solenoid powerful enough to shift the control valve mechanisms 87, 89 and 92 would be large and objectionably costly, yet it is advantageous to use the solenoid for operating these control valves. It is for that reason I use the pilot valves for each of the valve mechanisms 87, 89 and 92, for it takes such little power to move them and, therefore, the use of solenoids is unobjectionable. The necessary power to shift the control valve is thus obtained from the hydraulic system.

Referring back to the matter of the control of the operation of the members, it will be evident that through the switch arrangement I employ and the order of operation of the switches that there is an interlocking relation of the members which makes impossible the operation of a member except at the appointed time or times.

What I claim is:

1. A machine tool comprising a work spindle, means to vary the speed of such spindle from time to time during the performance of work, a to and fro moving tool holder, a constant speed prime mover, an operative connection between said prime mover and said tool holder comprising hydraulic mechanism that includes a pump, and an operative connection between spindle and tool holder comprising hydraulic mechanism that includes a pump under the control of the spindle during variation of spindle speed.

2. The combination of a member mounted for movement to and fro, hydraulic means to cause such movement comprising a hydraulically operated valve to control the fluid flow to impart different rates of movement to said member, and a supplemental control valve for said first mentioned valve and requiring substantially less power to move it, and electrical means for operating said supplemental valve, ports being present between the two valves whereby fluid supply to the first-mentioned valve is controlled.

3. A mechanism as in claim 2 having the electrical means for actuating said supplemental valve controlled by the member mounted for to and fro movement.

4. In a machine tool, the combination of work and tool holders and means for imparting relative movement to said holders for performance of work comprising a hydraulic cylinder, an operative connection between the cylinder and the holder to be moved, means to supply pressure to the cylinder relatively high and low as such holder movement proceeds in the same direction, another hydraulic cylinder, an operative connection between such other cylinder and a different holder to be moved, and means to supply pressure to said other cylinder at high and constant speed.

5. Hydraulic means for operating machine tools comprising a hydraulic cylinder, means to supply fluid to the cylinder, a control valve for such fluid supply, a supplemental valve that controls fluid supply to said first-mentioned valve to actuate the same thereby, and separate means to operate said supplemental valve.

6. Hydraulic means for operating machine tools comprising a hydraulic cylinder, a part moved by the cylinder, means to supply fluid to the cylinder, a control valve for such fluid supply, a supplemental valve that controls fluid supply to said first-mentioned valve to actuate the same thereby, separate means to operate said supplemental valve that comprises an electromagnet, and an automatically controlled circuit for such magnet, said circuit being controlled by said cylinder-moved part.

7. In a machine tool the combination of movable work and tool holders, means for moving them relative to one another for feeding as the tool action proceeds including hydraulic mechanism comprising pump means, means operatively connecting the pump means with one of said holders, said holder having a variable rate of movement, said variable rate of movement being accompanied with changes in the fluid discharge of said pump means, other pump means connected with the other holder and means operating said last-mentioned pump means independently.

8. A machine tool as in claim 7 in which one of said pump means acts at a constant speed.

9. In a turning lathe and like machine tool, the combination of a work spindle, means for automatically changing the speed of rotation of the work during rotation of the work, a hydraulic cylinder which actuates said means, a tool slide, means actuated by the tool slide to control the action of the hydraulic cylinder, electrical means operated by the tool slide for control of the machine tool, and a driving connection between spindle and tool slide which ensures upon speed-change of the spindle, preservation of a constant ratio between tool feed speeds and spindle speeds.

10. In a fluid-operated system for a mechanism having a member capable of movement at different speeds, the combination of such a member, a fluid moved motor operatively connected with such member, a low pressure fluid circuit, a high pressure fluid circuit, said circuits being connected with said motor for imparting respectively relatively faster and slower movements to said member, each of said circuits being adapted to function independently of the other, and means for selectively determining the functioning of said circuit.

11. A system as in claim 10 in which the member to be moved has a to and fro movement and in which the different speeds are imparted during movement in the same direction.

12. A system as in claim 10 in which the member to be moved has a to and fro movement and in which the different speeds are imparted during movement in the same direction and in which both circuits act upon the motor during rapid motion in one direction and the low pressure circuit acts alone during reverse rapid motion.

13. A system as in claim 10 in which the member to be moved has a to and fro movement and in which during the slower movement in one direction the high and low pressure fluid circuits act in opposition.

14. In a machine having a rotary work support, the combination of the rotary work support, a variable displacement piston pump directly driven from said rotary work support, driving means and means for connecting and disconnecting the rotary work support and said driving means, said pump operating automatically when rotation is imparted to the rotary work support when connected with the driving means.

15. The combination of a spindle, a fluid-operated motor, fluid propelling mechanism adapted to impart speed to said motor which is constantly proportional to the spindle speed, said propelling mechanism and said motor being included within a closed fluid circuit, said propelling mechanism being operable automatically in response to the rotation of the spindle.

16. In an automatic lathe, a frame, a spindle rotatably supported thereby, a driving means, a clutch mechanism for controlling the delivery of power from said driving means to said spindle, a slidable carriage, a fluid-operated actuator for moving said carriage, a variable displacement pump driven from said spindle for propelling said actuator, means for delivering fluid at low pressure to said actuator which is operable independently of said first mentioned pump, and means controlled by the low pressure fluid for shifting the clutch mechanism.

17. In an automatic lathe of the class described, a frame, a spindle rotatably mounted in said frame, a variable displacement pump driven from said spindle, a shiftable carriage, a fluid operated actuator connected with said pump for shifting said carriage, a driving means, a clutch mechanism for controlling the delivery of power from the driving means to the spindle, a constant volume pump driven by said driving means for delivering fluid at low pressure to said actuator, and a second fluid-operated actuator for controlling the clutch mechanism, said actuator being operatively connected with said gear pump independently of said variable displacement pump.

18. The combination of a member mounted for movement to and fro, hydraulic means to cause such movement comprising a hydraulically operated valve to control the fluid flow to impart different rates of movement and different directions of movement to said member, and a supplemental control valve for said first mentioned valve and requiring substantially less power to move it and electrical means for operating said supplemental valve, ports being present between the two valves whereby fluid supply to the first-mentioned valve is controlled.

19. In a machine tool having a work rotatable spindle and a to and fro moving tool carrier, means for moving the carrier to and fro relative to the spindle synchronously with the spindle speed, and electrically actuated automatic means for controlling the action of the spindle and of the carrier moving means including electrically actuated interlocking elements that prevent concurrent action of different members of the machine.

20. In a machine tool having a work rotatable spindle and a to and fro moving tool carrier, means for moving the carrier to and fro relative to the spindle, and electrically actuated automatic means for controlling the action of the spindle and of the carrier moving means including electrically actuated interlocking elements that prevent concurrent action of different members of the machine.

21. In a machine tool having a work rotatable spindle and a to and fro moving tool carrier, means for moving the carrier to and fro relative to the spindle, and electrically actuated automatic means for controlling said action, the carrier moving means including electrically actuated interlocking elements that prevent concurrent action of different members of the machine.

22. In a machine tool, the combination of a work-holding-device and a tool-holding device, a mechanism for rotating the work-holding-device including means to vary the speed of said rotation during rotation of the work, a mechanism for actuating the tool-holding-device to and from the work-holding device to cause the tools to operate upon the work and to be retracted therefrom, an electrical control means for controlling the functions of said machine-tool and operated synchronously with said tool-holding-device at predetermined times in the movement of said device, and an operative connection between the actuating mechanism of the work-holding-device and the actuating mechanism of the tool-holding-device which insures preservation of a constant ratio between the speed of movements of said devices upon a change of speed of rotation of the work-holding-device.

23. In a machine tool the combination of a work holding device and a tool holding device, mechanism for actuating said tool holding device to and from the work holding device to cause the tools to operate upon the work and to be retracted therefrom, at least another tool holding device movable to and from the work piece on the work holding device, and means for operating the same, an electrical control means for controlling said functions of said tool holding devices, said electrical control means including operable switch means and dogs therefor operated synchronously with the movement of said first tool holding device at predetermined times in the movement of the latter for effecting one operation of said second tool holding device and, further, including switches actuated by dog means synchronously with said second mentioned tool holding device for effecting another operation of the latter.

24. In a machine tool, the combination of a work carrying member and a tool carrying member one of which is rotatable and the other slidable, means for moving said members relatively for performing work and being synchronous with the rotatable member, means for moving said members relatively for idle movements and being at a constant speed, and control means for shifting said relative movement of said members from the work performing motion to the idle motion, or conversely, said control means including electric switches and circuits therefor operated synchronously with the slidable member at predetermined times in the operation of the latter.

25. In a machine tool, the combination of a work carrying member and a tool carrying member one of which is rotatable and the other slidable, means for moving said members relatively for performing work and being synchronous with the rotatable member, means for moving said members relatively for idle movements and being at a constant speed, and control means for shifting said relative movement of said members from the work performing motion to the idle motion, or conversely, said control means including electric switches and circuits therefor operated synchronously with the sliding member at predetermined times in the operation of the latter, said control means further including a time delay switch means in the circuit controlling the movement of the tool carrying member from slow feeding motion to fast idle motion.

26. In a machine tool, the combination of a work carrying member and a tool carrying member one of which is rotatable and the other slidable, means for moving said members relatively for performing work and being synchronous with the rotatable member, means for moving said members relatively for idle movements and being at a constant speed, and control means for shifting said relative movement of said members from the work performing motion to the idle motion, or conversely, said control means including electric switches and circuits therefor operated synchronously with the sliding member at predetermined times in the operation of the latter and also including other switches for effecting manual operation of the control means.

27. In a machine tool, the combination of a work carrying member and a tool carrying member one of which is rotatable and the other slidable, means for moving said members relatively for performing work and being synchronous with the rotatable member, means for moving said members relatively for idle movements and being at a constant speed, and control means for shifting said relative movement of said members from the work performing motion to the idle motion, or conversely, said control means including electric switches and circuits therefor operated synchronously with the sliding member at predetermined times in the operation of the latter, means for changing the speed of rotation of the rotatable member, and control means for said change speed means of said rotatable member including electric switches and circuits therefor operated synchronously with the sliding member at predetermined times in operation of the latter.

28. In a machine tool, the combination of a work carrying member and a tool carrying member one of which is rotatable and the other slidable, means for moving said members relatively for performing work and being synchronous with the rotatable member, means for moving said members relatively for idle movements and being at a constant speed, and control means for shifting said relative movement of said members from the work performing motion to the idle motion, or conversely, said control means including electric switches and circuits therefor operated synchronously with the sliding member at predetermined times in the operation of the latter, said slidable member including an indexable turret, means for indexing said turret, and control means for said indexing means including electrical switches and circuits therefor operated synchronously with said slidable member at a predetermined time in the movement of the latter.

29. In a machine tool, the combination of a work carrying device and a tool carrying device one of which is slidable, one of said devices being indexable, means for indexing the indexable device to present different tools to the work piece, and control means for said indexing means including electrical switches and circuits therefor operated synchronously with said slidable device at a predetermined time in the movement of the slidable device.

30. In a machine tool, the combination of a work carrying device and a tool holding device, means for indexing one of said devices indexable with respect to the other for presenting different tools to the work piece, mechanism for actuating one of said devices with respect to the other device to cause the tools to operate upon the work piece, and automatic control means for said indexing means including switches and dogs for operating the latter, said dogs being positioned for actuating said switches at predetermined times in the relative movement of said devices.

31. In a machine tool, the combination of a work carrying device and a tool holding device, means for indexing one of said devices indexable with respect to the other for presenting different tools to the work piece, mechanism for actuating one of said devices with respect to the other device to cause the tools to operate upon the work piece, and automatic control means for said indexing means including switches and dogs for operating the latter, said dogs being positioned for actuating said switches at predetermined times in the relative movement of said devices, said control means including means preventing operation of said indexing means when the said devices are in other than a predetermined position of their relative movement.

32. In a machine tool, a work carrying device and a tool carrying device, means for imparting relative movement to said devices for work performing operations, one of said devices being rotatable about a given axis for indexing the same to different stations and different work operations, means for locking said indexable device in indexed position, said indexable member being movable longitudinally of said axis into and out of locked position, means for rotating said indexable member to a new station when moved out of locked indexed position, and automatic means for controlling said operations of said devices including dogs and switches operated thereby at predetermined times during said movements of said devices.

33. In a machine tool as set forth in claim 32 further characterized by the indexable device being the tool carrying device comprising a turret and a slide.

34. In a machine tool as set forth in claim 32 further characterized by the indexable device being the tool carrying device comprising a turret and a slide, and the dogs of said control means being carried by said turret and said slide and in cooperative relation with said switches of said control means.

35. In a machine tool as set forth in claim 32 further characterized by the indexable device being the tool carrying device comprising a turret and a slide, means for rotating the work carrying device, means to change the speed of rotation of the work carrying device, and means for controlling said change of speed of the work carrying device which includes dogs and switches operated by the former at predetermined times in the movement of said slide.

36. In a machine tool as set forth in claim 32 further characterized by the indexable device being the tool carrying device comprising a turret and a slide, means for rotating the work carrying device, means to change the speed of rotation of the work carrying device, and means for controlling said change of speed of the work carrying device which includes dogs and switches operated by the former at predetermined times in the movement of said slide, and an operative connection between the work carrying device and the means for imparting work performing movements to the tool carrying device which insures preservation of a constant ratio between the speed movements of said devices upon a change of speed of rotation of the work carrying device.

37. In a machine tool, the combination of a work carrying device and a tool carrying device, means for moving said devices relative to each other for work performing operations, one of said devices comprising a rotatable turret adapted to be indexed relative to a work performing station, a plurality of slides slidably mounted on the turret and adapted to be brought respectively and at different times to the work performing station, means for indexing the turret, means for engaging and moving the slide of the turret at the work performing station, and means for retaining the other of said slides in position for cooperation with said slide moving means when said turret has been indexed to bring any of said slides to the work performing station.

38. In a device as set forth in claim 37 further characterized by the slide retaining means comprising interengaging parts between the slide and a relatively stationary part of the machine and which latter is interrupted at the work performing station, and a corresponding interengaging part on said slide moving means at the work performing station and forming a continuation of said relatively stationary interengaging part of the machine when said turret is indexed.

39. In a machine tool the combination of a work holding device and a tool holding slidable turret, means for indexing the turret, means for moving the slidable turret to and from the work holding device including an electrically operated control means for changing the direction of to and fro movement of said slidable turret, said control device including operable switch means and actuating dogs therefor operated synchronously with the to and fro movement of said slidable turret for actuating said switch at different positions of said slidable turret, and means for preventing indexing of said turret during the to and fro movement of said slidable turret, means including electrical switches and circuits therefor for actuating said indexing means and preventing operation of said indexing means during to and fro movement of said slidable turret.

40. In a machine tool, the combination of an indexable turret, a member containing a seat for said turret, positive means for locking the turret to the member when in an indexed position, means for unlocking said turret including means for lifting it from its seat to disengage it from said positive locking means and returning the turret to its seat for engagement with said locking means after indexing, and means for indexing the turret while in its raised position comprising an intermittent motion mechanism for moving the turret step by step from station to station.

41. In a machine tool, a plurality of successively acting members including tool carrying members, mechanism for moving said members respectively, relative to each other which includes means for changing the speed of certain of said members and for changing the direction of movement of certain of said members, and control mechanism for said members comprising electrical means having electrical circuits with switches therein actuated in selective succession with the movement of certain of said members, and means operated synchronously with the movement of certain of said members for actuating said switches, said switches being arranged to change the speed of certain of said members at selected times, to reverse the direction of movement of certain of said members at selected times and to prevent concurrent operation of certain of said members except when other of said members are in a desired position.

42. In a machine-tool, the combination of a work carrying device and a tool holding device, one of said devices being indexable, means for indexing said indexable device with respect to the other for presenting different tools to the work piece, mechanism for actuating one of said devices with respect to the other device to cause the tools to operate upon the work piece, automatic control means for said indexing means including switches and dogs for operating the latter, automatic control means for said mechanism including switches and dogs for operating the latter, said latter control means including means preventing operation of said mechanism except when the indexable device is in an indexed position.

43. In a machine-tool, the combination of a frame, a spindle rotatable within said frame, driving means for imparting rotation to said spindle at constant speed, a fluid-operated actuator, a variable displacement pump driven from said spindle for delivering fluid at high pressure to said actuator, and a constantly driven pump connected directly with said spindle driving means for delivering fluid at constant low pressure to said actuator.

44. In a machine-tool, the combination of a frame, a spindle rotatably mounted within said frame, a carriage for moving a tool transversely of said spindle, a fluid operated actuator for moving said carriage, a variable displacement pump driven from said spindle for imparting feeding movement to said actuator, a second carriage for moving a tool axially of said spindle, a second fluid operated actuator for shifting said second carriage, a second variable displacement pump driven from said spindle for moving said second actuator, and means controlled by the predetermined positions of said carriages in their movements for rendering said variable displacement pumps effective or ineffective for operating their respective actuators.

45. In a hydraulic actuator system for moving machine parts and the like, a hydraulic actuator including a piston shiftable within a cylinder, fluid propelling means for imparting feeding movement to said actuator, a second fluid propelling means for imparting rapid traverse to said actuator, both of said propelling means being operatively connected with said cylinder, a shiftable control valve adapted to occupy one of at least three positions, and means connecting said valve with said second fluid propelling means, said valve being adapted in one position to effect the circulation of fluid from said second propelling means independently of the fluid discharged by the first mentioned propelling means, a second shifted position of said valve serving to operatively connect said second mentioned propelling means for rapid traverse purposes with said actuator, and a third shifted position of said valve serving to direct fluid in a reverse direction for rapid traverse purposes to said actuator.

46. In a hydraulic actuator system for moving machine parts and the like, a hydraulic actuator including a piston shiftable within a cylinder, fluid propelling means for imparting feeding movement to said actuator, a second fluid propelling means for imparting rapid traverse to said actuator, both of said propelling means being connected with said cylinder, a shiftable control valve in said connection and adapted to occupy one of several positions, namely, a stop position, a fast-ahead position, a slow feed-ahead position and a reverse position, said valve being adapted when in the stop position to effect the circulation of fluid from said second propelling means independently of the fluid discharged by the first mentioned propelling means, when in the fast-ahead position serving to operatively connect said second mentioned propelling means for rapid traverse purposes with said actuator, when in the slow feed-ahead position serving to render said first mentioned propelling means effective for feeding movement of the actuator and rendering said second propelling means ineffective for forward movement of the actuator, and when in reverse position serving to direct fluid from the second propelling means to the actuator for reversing the direction of movement thereof for rapid traverse purposes to said actuator.

47. In a hydraulic actuator system for moving machine parts and the like, a hydraulic actuator including a piston shifting within a cylinder, a relatively high pressure pumping means for imparting feeding movement to said piston, a relatively low pressure high displacement pumping means for imparting rapid traverse to said piston, a shiftable control valve, said valve having a pair of ports hydraulically connected with opposite sides of said actuator piston and a port connectable with the discharge side of the low pressure pumping mechanism, said valve being adapted in one shifted position to close the ports connected with the actuator and thereby operatively disconnect the low pressure pumping means with respect to said actuator and in a second shifted position serving to open said ports so as to operatively connect said low pressure pumping means for rapid traverse purposes to said actuator, and means for automatically effecting the sudden shifting of said control valve in time relation with the movement of said actuator piston.

48. In a machine-tool having a work spindle and a to and fro moving tool carrier, hydraulic means for moving the carrier to and fro relative to work on the spindle and comprising a hydraulic circuit, a cylinder and a piston therein and fluid connections with the cylinder at both sides of the piston, and such circuit including a control valve, electrical means for moving said valve in opposite directions to change the direction of flow through the hydraulic circuit, said electrical means including switches operated by the movement of said valve for opening and closing an operating circuit forming a part of said electrical means, and means for rendering said electrical means effective when said carrier is in certain of its positions.

49. A machine-tool as set forth in claim 44 further characterized by the electrical means comprising means operated by the tool carrier at the end of its work performing stroke for causing operation of said control valve to exhaust the work performing feeding pressure from said cylinder and enabling pressure on the other side of the piston to move the piston in opposite direction for reversing movement of the tool carrier.

MYRON S. CURTIS.